US010516758B2

(12) United States Patent
Hong et al.

(10) Patent No.: US 10,516,758 B2
(45) Date of Patent: Dec. 24, 2019

(54) METHOD FOR PROVIDING PERSONAL INFORMATION

(71) Applicant: National Taiwan Normal University, Taipei (TW)

(72) Inventors: Jon-Chao Hong, Taipei (TW); Ming-Yueh Hwang, Taipei (TW); Kai-Hsin Tai, Taipei (TW); Kai-Wen Tai, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 215 days.

(21) Appl. No.: 15/493,652

(22) Filed: Apr. 21, 2017

(65) Prior Publication Data

US 2018/0309846 A1 Oct. 25, 2018

(51) Int. Cl.
*H04L 29/08* (2006.01)

(52) U.S. Cl.
CPC .......... *H04L 67/327* (2013.01); *H04L 67/306* (2013.01)

(58) Field of Classification Search
CPC .... H04L 67/327; H04L 66/306; H04L 67/306
See application file for complete search history.

(56) References Cited

U.S. PATENT DOCUMENTS 10,033,737 B2 * 7/2018 Sheinfeld ................ H04L 63/10
10,130,872 B2 * 11/2018 Buhr ....................... A63F 13/61
2004/0148347 A1 * 7/2004 Appelman ........ H04L 29/08684 709/204
2010/0223140 A1 * 9/2010 Bosan .................... G06Q 30/02 705/14.64
2011/0145931 A1 * 6/2011 Galbreath .............. G06Q 30/02 726/28
2011/0185020 A1 * 7/2011 Ramamurthy ......... G06Q 10/10 709/204
2011/0288939 A1 * 11/2011 Elvekrog ........... G06Q 30/0269 705/14.67
2013/0151645 A1 * 6/2013 Siliski ................... H04W 4/021 709/213

FOREIGN PATENT DOCUMENTS

CN 102654876 A 9/2012
TW M513415 U 12/2015

OTHER PUBLICATIONS

Taiwanese Search Report for Taiwanese Application No. 106116947, dated Oct. 30, 2018, with English translation.

* cited by examiner

*Primary Examiner* — Thu V Nguyen
*Assistant Examiner* — Aye M Aung
(74) *Attorney, Agent, or Firm* — Birch, Stewart, Kolasch & Birch, LLP

(57) ABSTRACT

A method for providing personal information is proposed. A server unit receives preference information of a user from a terminal device, and matches the preference information with another user's preference information in a database according to a matching condition. The server unit provides the another user's preference information to the terminal device when the matching condition is satisfied by the preference information of the user and the another user.

5 Claims, 2 Drawing Sheets

Start
S01 Transmit information of predetermined themes and predetermined option groups to a terminal device
S02 Receive a target user preference information piece from the terminal device
S03 Receive information of a predetermined threshold number from the terminal device
S04 Determine, for one of the reference user preference information pieces, whether or not a matching condition is satisfied by the target user preference information piece and the reference user preference information piece
No
Yes
S05 Transmit a personal information piece to the terminal device
S06 Determine whether or not step S04 has been performed for all of the reference preference information pieces
No
Yes
S07 Update the preference database by adding the target user preference information piece therein
End

METHOD FOR PROVIDING PERSONAL INFORMATION

FIELD

The disclosure relates to a method for providing personal information using cloud technology.

BACKGROUND

Recently, social networking application software has become popular. A kind of conventional social networking application software simply provides images of other registered members to a registered user for user to browse and determine whether to make contact.

SUMMARY

Therefore, an object of the disclosure is to provide a method for providing personal information that is suitable for social networking.

According to the disclosure, the method for providing personal information includes steps of: (a) providing a server unit that has a preference database containing a plurality of reference user preference information pieces, and that stores a plurality of predetermined themes respectively corresponding to a plurality of different places, and a plurality of predetermined option groups respectively corresponding to the places, wherein each of the predetermined option groups contains a plurality of different options, and each of the reference user preference information pieces is associated with one of a plurality of reference users, is associated with a reference theme which is one of the predetermined themes, and corresponds to at least one option of a reference option group which is one of the predetermined option groups and which corresponds to the reference theme; (b) the server unit transmitting information of the predetermined themes and the predetermined option groups to a terminal device; (c) the server unit receiving a target user preference information piece from the terminal device, wherein the target user preference information piece is generated by the terminal device according to an input on the terminal device, and is associated with a target user, is associated with a target theme which is one of the predetermined themes, and corresponds to at least one option of a target option group which is one of the predetermined option groups and which corresponds to the target theme; (d) upon receipt of the target user preference information piece, the server unit determining, for an arbitrary one of the reference user preference information pieces, whether or not a matching condition is satisfied by the target user preference information piece and the reference user preference information piece, wherein the matching condition is satisfied when the target theme and the reference theme are the same and a number of same option or options between the at least one option of the target option group and the at least one option of the reference option group is equal to or greater than a predetermined threshold number; and (e) when the determination made in step (d) is affirmative for one of the reference user preference information pieces, the server unit transmitting a personal information piece to the terminal device, wherein the personal information piece relates to a reference user who is associated with the reference user preference information piece.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
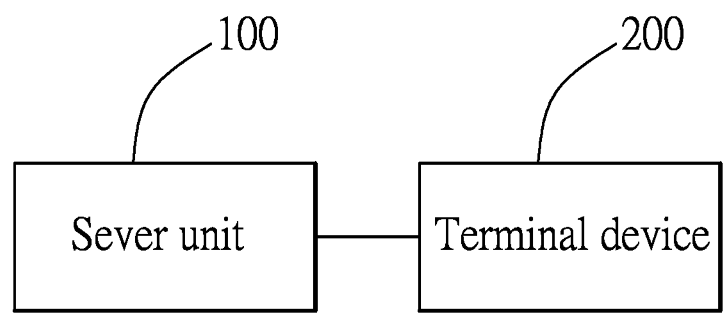
FIG. 1 is block diagram illustrating a server unit and a terminal device that are used to implement the embodiment of the method for providing personal information according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
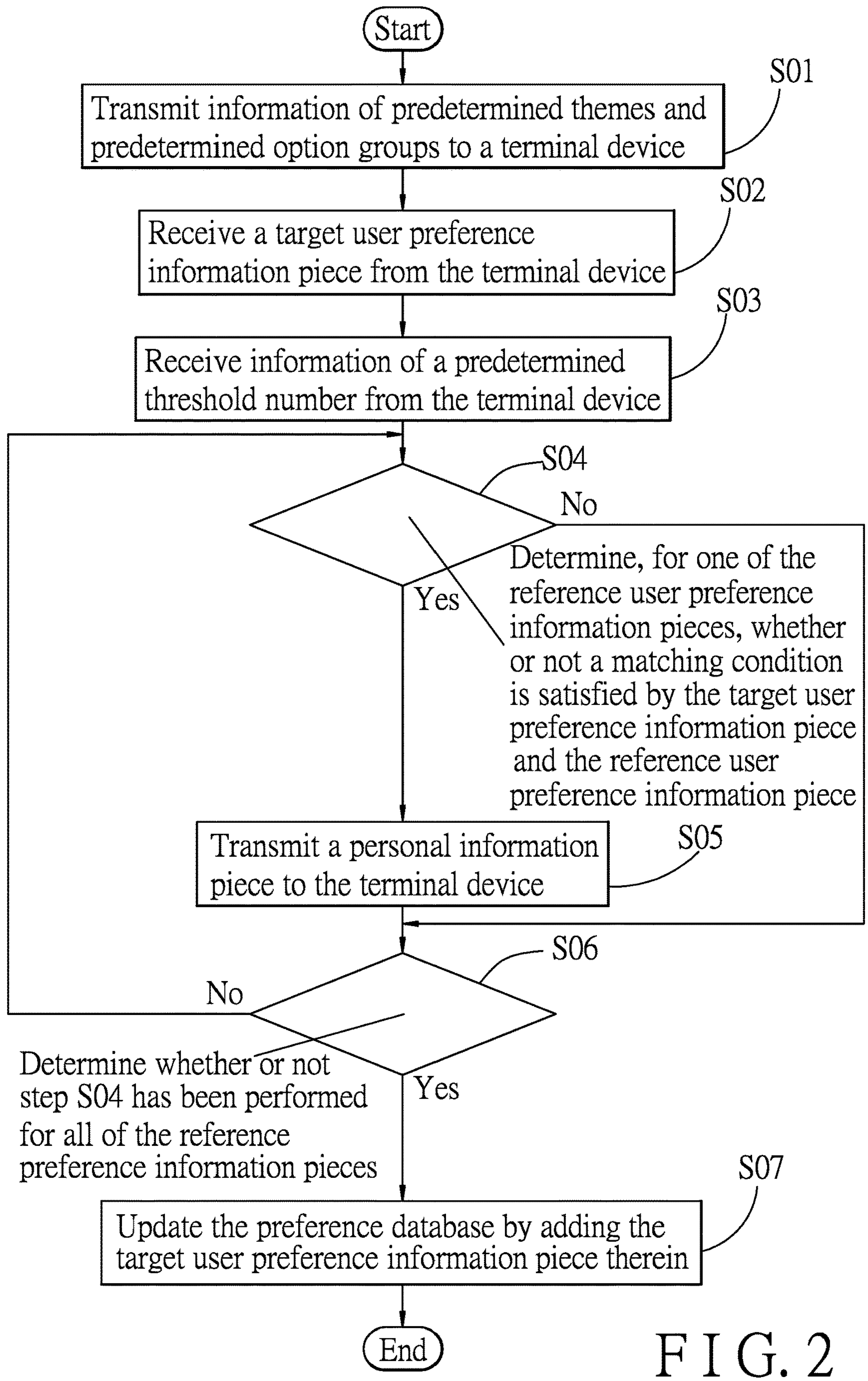
FIG. 2 is a flow chart illustrating steps of the embodiment.

Referring to FIGS. 1 and 2, the embodiment of the method that provides personal information is implemented by a server unit 100 that is communicatively coupled to a terminal device 200, which may be an electronic device capable of computation and communication, such as a smartphone or a personal computer, and which is operated by a target user.

The server unit 100 has a preference database, and stores a plurality of predetermined themes respectively corresponding to a plurality of different places, and a plurality of predetermined option groups respectively corresponding to the places. Each of the predetermined option groups contains a plurality of different options. In this embodiment, each of the places corresponds to a restaurant, a museum, an art gallery, a movie theater, an amusement park or a sports center. For instance, a first predetermine theme may be associated with a certain restaurant, and the options of a first option group corresponding to the first predetermined theme may respectively relate to multiple meals available in the certain restaurant; and a second predetermine theme may be associated with a certain museum, and the options of a second option group corresponding to the second predetermined theme may respectively relate to multiple exhibits in the certain museum.

The preference database contains a plurality of reference user preference information pieces. Each of the reference user preference information pieces is associated with one of a plurality of reference users, is associated with a reference theme which is one of the predetermined themes, and corresponds to at least one option of a reference option group which is one of the predetermined option groups and which corresponds to the reference theme.

In this embodiment, the server unit 100 transmits information of the predetermined themes and the predetermined option groups to the terminal device 200 in step S01.

In step S02, the server unit 100 receives a target user preference information piece from the terminal device 200. The target user preference information piece is generated by the terminal device 200 according to an input on the terminal device 200, and is associated with the target user, is associated with a target theme which is one of the predetermined themes, and corresponds to at least one option of a target option group which is one of the predetermined option groups and which corresponds to the target theme.

In step S03, the server unit 100 receives information of a predetermined threshold number from the terminal device 200. The information of the predetermined threshold number is generated by the terminal device 200 according to an input on the terminal device 200. It is noted that this step is not necessarily performed after step S02, and this disclosure is not limited in the order in which this step is performed.

In step S04, upon receipt of the target user preference information piece, the server unit 100 determines, for one of the reference user preference information pieces, whether or not a matching condition is satisfied by the target user preference information piece and the reference user preference information piece. The matching condition is satisfied when the target theme and the reference theme are the same and a number of same option or options between the at least one option of the target option group and the at least one option of the reference option group is equal to or greater than the predetermined threshold number. In one example, it is assumed that the target user preference information piece is associated with a first restaurant, and is associated with meals A, B and C of the overall fifty meals available in the first restaurant, that a first reference user preference information piece is associated with the first restaurant, and is associated with meals A, B and D of the overall fifty meals available in the first restaurant, and that the predetermined threshold number is two. In this example, since both of the target and reference user preference information pieces are associated with the same restaurant, and a number of the same associated meals (i.e., the meals A and B) is two, which equals the predetermined threshold number, the server unit 100 determines that the matching condition is satisfied between the target user preference information piece and the first reference user preference information piece. The flow goes to step S05 when the determination is affirmative, and goes to step S06 when otherwise.

In step S05, the server unit 100 transmits a personal information piece to the terminal device 200. The personal information piece relates to a reference user who is associated with the reference user preference information piece, and may include information of for example a portrait, a nickname and/or contact method of the reference user. Accordingly, the target user may determine whether to make contact with the reference user by for example text messaging or multimedia messaging.

In step S06, the server unit 100 determines whether or not step S04 has been performed for all of the reference user preference information pieces. The flow goes to step S07 when the determination is affirmative, and goes back to step S04 for the server unit 100 to perform the determination for another reference user preference information piece on which the determination has not been performed.

In step S07, the server unit 100 updates the preference database by adding the target user preference information piece therein as an additional one of the reference user preference information pieces.

In summary, the method for providing personal information according to this disclosure uses the matching condition to perform matching between the target user preference information piece and each reference user preference information piece, so as to ensure that the matched target user and reference user have a certain level of similarity in preference or habits, enhancing chances of developing good relationship between the matched target user and reference user. In addition, use of the predetermined threshold number allows the server 100 to perform matching with higher efficiency, while providing higher flexibility in use as the predetermined threshold number is determined by the target user as desired.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for providing personal information, comprising steps of:

(a) providing a server unit that has a preference database containing a plurality of reference user preference information pieces, and that stores a plurality of predetermined themes respectively corresponding to a plurality of different places, and a plurality of predetermined option groups respectively corresponding to the plurality of different places, wherein each of the plurality of predetermined option groups contains a plurality of different options, and each of the plurality of reference user preference information pieces is associated with one of a plurality of reference users, is associated with a reference theme which is one of the plurality of predetermined themes, and corresponds to at least one option of a reference option group which is one of the plurality of predetermined option groups and which corresponds to the reference theme;

(b) the server unit transmitting information of the plurality of predetermined themes and the plurality of predetermined option groups to a terminal device;

(c) the server unit receiving a target user preference information piece from the terminal device, wherein the target user preference information piece is generated by the terminal device according to an input on the terminal device, and is associated with a target user, is associated with a target theme which is one of the plurality of predetermined themes, and corresponds to at least one option of a target option group which is one of the plurality of predetermined option groups and which corresponds to the target theme;

(d) upon receipt of the target user preference information piece, the server unit determining, for an arbitrary one of the plurality of reference user preference information pieces, whether or not a matching condition is satisfied by the target user preference information piece and the reference user preference information piece, wherein the matching condition is satisfied when the target theme and the reference theme are the same and a number of same option or options between the at least one option of the target option group and the at least one option of the reference option group is equal to or greater than a predetermined threshold number; and (e) when the determination made in step (d) is affirmative for one of the plurality of reference user preference information pieces, the server unit transmitting a personal information piece to the terminal device, wherein the personal information piece relates to a reference user who is associated with the reference user preference information piece.

2. The method of claim 1, wherein step (d) is performed for each of the plurality of reference user preference information pieces.

3. The method of claim 1, further comprising a step of: (f) before step (d), the server unit receiving information of the predetermined threshold number from the terminal device, wherein the information of the predetermined threshold number is generated by the terminal device according to an input on the terminal device.

4. The method of claim 1, further comprising a step of: (f) after step (d), the server unit updating the preference database by adding the target user preference information piece therein as an additional one of the plurality of reference user preference information pieces.

5. The method of claim 1, wherein each of the plurality of different places corresponds to one of a restaurant, a museum, an art gallery, a movie theater, an amusement park and a sports center.

* * * * *